(12) United States Patent
Al-Ahmed et al.

(10) Patent No.: US 10,843,135 B2
(45) Date of Patent: Nov. 24, 2020

(54) HOLLOW FIBER MEMBRANE MODIFIED WITH MOLYBDENUM TRIOXIDE NANOPARTICLES

(71) Applicant: King Fahd University of Petroleum and Minerals, Dhahran (SA)

(72) Inventors: Amir Al-Ahmed, Dhahran (SA); Arun M. Isloor, Mangalore (IN)

(73) Assignee: King Fahd University of Petroleum and Minerals, Dhahran (SA)

( * ) Notice: Subject to any disclaimer, the term of this patent is extended or adjusted under 35 U.S.C. 154(b) by 206 days.

(21) Appl. No.: 15/722,450

(22) Filed: Oct. 2, 2017

(65) Prior Publication Data

US 2019/0099719 A1 Apr. 4, 2019

(51) Int. Cl.
*B01D 63/02* (2006.01)
*C01G 39/02* (2006.01)
(Continued)

(52) U.S. Cl.
CPC ......... *B01D 63/023* (2013.01); *B01D 61/145* (2013.01); *B01D 67/0079* (2013.01);
(Continued)

(58) Field of Classification Search
CPC ...... B01D 63/023; B01D 69/02; B01D 69/08; B01D 69/148; B01D 61/145; B01D 67/0079; B01D 71/024; B01D 71/68; B01D 2311/04; B01D 2311/2619; B01D 2315/06; B01D 2325/06; C02F 1/30; C02F 1/62; C02F 1/444; C02F 3/1268; C02F 2101/20; C02F 2101/308; C02F 2305/08; C08G 75/20; C01G 39/02; C01P 2002/72;
(Continued)

(56) References Cited

U.S. PATENT DOCUMENTS

2004/0050791 A1* 3/2004 Herczeg ............... B01D 61/145
210/651
2007/0137477 A1* 6/2007 Freeman ............... B01D 53/228
95/45

(Continued)

FOREIGN PATENT DOCUMENTS

CN 103170260 9/2014
CN 104226129 12/2014
DE 10201785 3/2003

OTHER PUBLICATIONS

Guy-Germain Allogho et al., "Wettability and photochromic behaviour of Molybdenum oxide thin films," Thin Solid Films, vol. 520, 2012, pp. 2326-2330.

(Continued)

*Primary Examiner* — John Kim
(74) *Attorney, Agent, or Firm* — Oblon, McClelland, Maier & Neustadt, L.L.P.

(57) ABSTRACT

A hollow fiber (HF) membrane incorporating molybdenum trioxide ($MoO_3$) nanoparticles. The membrane may be composed of PPSU hollow fibers that are coated or encrusted with $MoO_3$ nanoparticles and can be made by dry-wet spinning. The hollow fiber membranes containing $MoO_3$ nanoparticles remove lead, cadmium or other heave metals from waste water and are resistant to attachment of bacteria and fouling.

20 Claims, 9 Drawing Sheets

(51) Int. Cl.
*C02F 1/44* (2006.01)
*C02F 1/62* (2006.01)
*C02F 1/30* (2006.01)
*C02F 3/12* (2006.01)
*C08G 75/20* (2016.01)
*B01D 69/02* (2006.01)
*B01D 69/14* (2006.01)
*B01D 61/14* (2006.01)
*B01D 71/68* (2006.01)
*B01D 69/08* (2006.01)
*B01D 71/02* (2006.01)
*B01D 67/00* (2006.01)
*B82Y 30/00* (2011.01)
*C02F 101/30* (2006.01)
*C02F 101/20* (2006.01)

(52) U.S. Cl.
CPC .............. *B01D 69/02* (2013.01); *B01D 69/08* (2013.01); *B01D 69/148* (2013.01); *B01D 71/024* (2013.01); *B01D 71/68* (2013.01); *C01G 39/02* (2013.01); *C02F 1/30* (2013.01); *C02F 1/444* (2013.01); *C02F 1/62* (2013.01); *C02F 3/1268* (2013.01); *C08G 75/20* (2013.01); *B01D 2311/04* (2013.01); *B01D 2311/2619* (2013.01); *B01D 2315/06* (2013.01); *B01D 2325/06* (2013.01); *B82Y 30/00* (2013.01); *C01P 2002/72* (2013.01); *C01P 2002/82* (2013.01); *C01P 2004/03* (2013.01); *C01P 2004/61* (2013.01); *C01P 2006/22* (2013.01); *C02F 2101/20* (2013.01); *C02F 2101/308* (2013.01); *C02F 2305/08* (2013.01)

(58) Field of Classification Search
CPC .............. C01P 2002/82; C01P 2004/03; C01P 2004/61; C01P 2006/22; B82Y 30/00
See application file for complete search history.

(56) References Cited

U.S. PATENT DOCUMENTS

| | | | |
|---|---|---|---|
| 2010/0035047 A1* | 2/2010 | Ajayan | C08J 3/20 428/328 |
| 2016/0045874 A1* | 2/2016 | Deng | B01D 69/08 210/500.23 |
| 2016/0136585 A1* | 5/2016 | Hoek | B01D 69/141 210/644 |
| 2018/0154315 A1* | 6/2018 | Berzinis | B01D 67/0016 |

OTHER PUBLICATIONS

C. Julien et al., "Synthesis and characterization of flash-evaporated $MoO_3$ thin films," Journal of Crystal Growth, vol. 156, 1995, pp. 235-244.

Hui Liu et al., "$CO_2$-tolerant U-shaped hollow fiber membranes for hydrogen separation," International Journal of Hydrogen Energy, vol. 42. No. 7, Feb. 16. 2017, pp. 4208-4215.

Heidi Lynn Richards et al., "Metal Nanoparticle Modified Polysulfone Membranes for Use in WasteWater Treatment: A Critical Review," Journal of Surface Engineered Materials and Advanced Technology, 2012, vol. 2, 183-193.

* cited by examiner

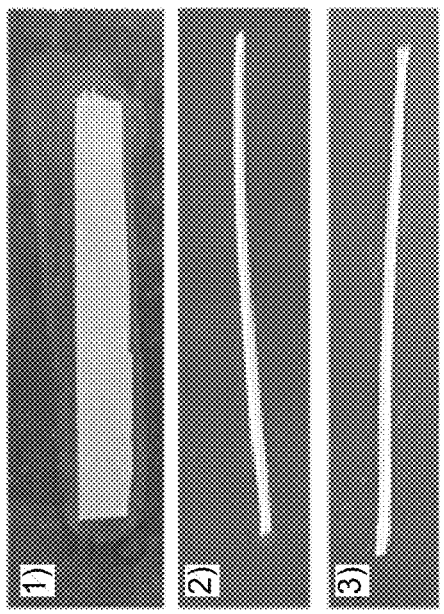
FIG. 12A
FIG. 12B
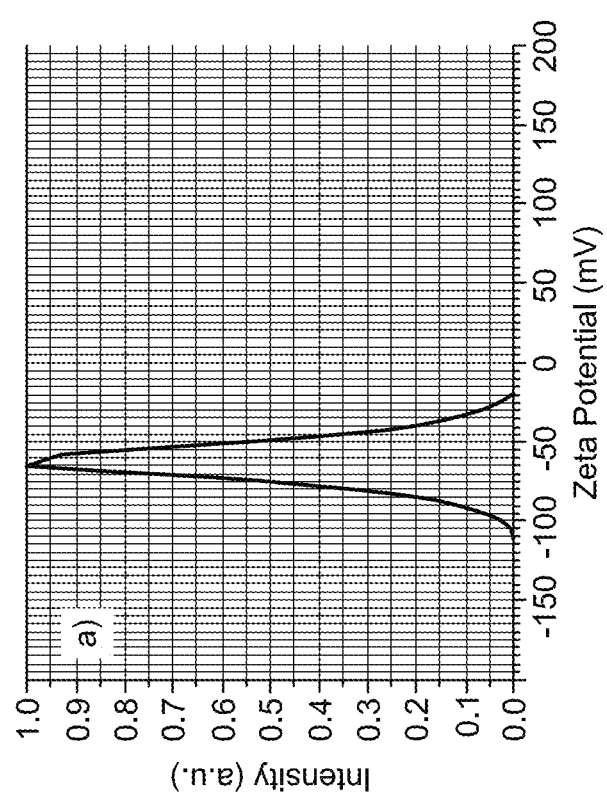
FIG. 13

HOLLOW FIBER MEMBRANE MODIFIED WITH MOLYBDENUM TRIOXIDE NANOPARTICLES

BACKGROUND

Field of the Invention

The invention is directed to hollow fiber membranes and to methods for removing contaminants such as heavy metals from waste water. The hollow fiber (HF) membrane incorporates molybdenum trioxide ($MoO_3$) nanoparticles and is preferably composed of polyphenylsulfone (PPSU) hollow fibers in combination with $MoO_3$ nanoparticles as is made by dry-wet spinning. The hollow fiber membranes containing $MoO_3$ nanoparticles may be used to remove lead, cadmium or other heavy metals, or dyes, from waste water and are resistant to the attachment of microorganisms.

Description of Related Art

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

Waste water containing toxic heavy metals and dyes resulting from manufacturing and other industrial procedures is often directly discharged into the water sources without any prior treatment. The toxic, carcinogenic and mutagenic nature of some of the dyes and heavy metal ions in such discharges can cause a threat to humans, animals, and plants and disrupt ecological systems. See K. T. Chung, S. E. Stevens, Degradation azo dyes by environmental microorganisms and helminths, Environ Toxicol. Chem., 12 (1993) 2121-2132; and A. Kunz, P. Peralta-Zamora, S. G. de Moraes, N. Durán, *Novas tendéncias no tratamento de efluentes têxteis,* Quím. Nova, 25 (2002) 78-82, each incorporated herein by reference in their entirety. Hence the efficient treatment of the polluted water is very crucial.

Different techniques such as biological treatment, sorption technique, ozone treatment, chemical precipitation, photocatalytic degradation, membrane filtration and wet oxidation techniques are employed to remove pollutants from industrial wastewater. See T. A. Kurniawan, G. Y. Chan, W.-H. Lo, S. Babel, *Physico-chemical treatment techniques for wastewater laden with heavy metals,* Chem. Eng. J., 118 (2006) 83-98; P. R. Gogate, A. B. Pandit, *A review of imperative technologies for wastewater treatment I: oxidation technologies at ambient conditions,* Adv Environ Res. 8 (2004) 501-551; M. Baeza-Alvarado, M. Olguin, *Surfactant-modified clinoptilolite-rich tuff to remove barium ($Ba^{2+}$) and fulvic acid from mono- and bi-component aqueous media,* Microporous. Mesoporous Mater., 139 (2011) 81-86; P. Sharma, G. Singh, R. Tomar, *Synthesis and characterization of an analogue of heulandite: Sorption applications for thorium (IV), europium (III), samarium (II) and iron (III) recovery from aqueous waste,* J. Colloid Interface Sci., 332 (2009) 298-308; and J. Lin, W. Ye, M.-C. Baltaru, Y. P. Tang, N. J. Bernstein, P. Gao, S. Balta, M. Vlad, A. Volodin, A. Sotto, *Tight ultrafiltration membranes for enhanced separation of dyes and $Na_2SO_4$ during textile wastewater treatment,* J. Membr. Sci., 514 (2016) 217-228, each incorporated herein by reference in their entirety.

Nano-sized transition metal oxides like oxides of iron, manganese, aluminum, and titanium have been widely used for heavy metal and dye removal studies. See C. Chen, X. Li, W. Ma, J. Zhao, H. Hidaka, N. Serpone, *Effect of transition metal ions on the TiO2-assisted photodegradation of dyes under visible irradiation: a probe for the interfacial electron transfer process and reaction mechanism,* J. Phys. Chem. B, 106 (2002) 318-324; A. Bashir, S. Ahad, A. H. Pandith, *Soft Template Assisted Synthesis of Zirconium Resorcinol Phosphate Nanocomposite Material for the Uptake of Heavy-Metal Ions,* Ind. Eng. Chem. Res., 55 (2016) 4820-4829; C.-Y. Cao, J. Qu, W.-S. Yan, J.-F. Zhu, Z.-Y. Wu, W.-G. Song, *Low-cost synthesis of flowerlike $\alpha$-$Fe_2O_3$ nanostructures for heavy metal ion removal: adsorption property and mechanism,* Langmuir, 28 (2012) 4573-4579; and V. R. Pereira, A. M. Isloor, A. Al Ahmed, A. Ismail, *Preparation, characterization and the effect of PANI coated $TiO_2$ nanocomposites on the performance of polysulfone ultrafiltration membranes,* New J. Chem., 39 (2015) 703-712, each incorporated herein by reference in their entirety. Sorption of heavy metal ions by transition metal oxides is reported to be an effective method for the removal of toxic heavy metals, so as to fulfil increasingly strict rules.

Molybdenum trioxide ($MoO_3$) nanostructures have become attractive due to their photocatalytic and adsorptive properties. The photocatalytic degradation of dye by $MoO_3$ nanoparticles is due to the large band gap of 2.8-3.0 eV, which lies in the visible light region. See G.-G. Allogho, P. Ashrit, *Wettability and photochromic behaviour of Molybdenum oxide thin films,* Thin Solid Films, 520 (2012) 2326-2330; and C. Julien, A. Khelfa, O. Hussain, G. Nazri, *Synthesis and characterization of flash-evaporated $MoO_3$ thin films,* J. Cryst. Growth, 156 (1995) 235-244, each incorporated herein by reference in their entirety.

$MoO_3$ is also used as an oxidative catalyst, in gas sensors, photochromic coatings, and additives in paint. See F. Paraguay-Delgado, M. Albiter, R. Huirache-Acuña, Y. Verde, G. Alonso-Nuñez, *Optimization of the synthesis of $\alpha$-MoO3 nanoribbons and hydrodesulfurization (HDS) Catalyst Test,* J. Nanosci. Nanotechnol, 7 (2007) 3677-3683; S. Sunu, E. Prabhu, V. Jayaraman, K. Gnanasekar, T. Seshagiri, T. Gnanasekaran, *Electrical conductivity and gas sensing properties of $MoO_3$,* Sens Actuators B Chem, 101 (2004) 161-174; L. Cheng, M. Shao, X. Wang, H. Hu, *Single-Crystalline Molybdenum Trioxide Nanoribbons: Photocatalytic, Photoconductive, and Electrochemical Properties,* Chem. Eur. J., 15 (2009) 2310-2316; S. M. Hussain, K. L. Hess, J. M. Gearhart, K. T. Geiss, J. J. Schlager, *In vitro toxicity of nanoparticles in BRL 3A rat liver cells,* Toxicology in vitro, 19 (2005) 975-983; and B. Keshavarzi, F. Moore, A. Najmeddin, F. Rahmani, *The role of selenium and selected trace elements in the etiology of esophageal cancer in high risk Golestan province of Iran,* Sci. Total Environ., 433 (2012) 89-97; each incorporated herein by reference in their entirety. Molybdenum materials are also reported to possess great importance for the sorption of heavy metals. See M. Chehbouni, A. W. Apblett, *Molybdenum-Oxide Based Sorbants for Toxic Metals,* Environmental Issues and Waste Management Technologies in the Ceramic and Nuclear Industries XI, Volume 176, (2005) 15-23; and C. K. Perkins, K. N. Barber, A. W. Apblett, *Direct conversion of a nanometric suspension of molybdenum trioxide into nanometric lead molybdate,* Cryst Eng Comm, 16 (2014) 2869-2873, each incorporated herein by reference in its entirety.

Kapnisti et al. demonstrated the extensive and selective efficiency of AHM-derived $MoO_3$ for the removal of lead and uranium ions. See M. G. Kapnisti, F. G. Noli, J. Arvanitidis, A. G. Hatzidimitriou, *Thermally modified molybdenum oxide as a potential sorbent for the removal of metal cations from aqueous solutions,* J. Radioanal. Nucl. Chem., 307 (2016) 555-565, incorporated herein by reference in its entirety. The chemisorption of Pb and U takes place, resulting in insoluble molybdates of Pb and U, such as wulfenite ($PbMoO_4$) and umohoite $UMoO_6 \cdot 2H_2O$.

$MoO_3$ nanoparticles (NPs) have been synthesized by various methods including hydrothermal, solvothermal, and sol-gel methods. See A. Phuruangrat, J. S. Chen, X. W. Lou, O. Yayapao, S. Thongtem, T. Thongtem, *Hydrothermal synthesis and electrochemical properties of α-MoO3 nanobelts used as cathode materials for Li-ion batteries*, Appl. Phys. A, 107 (2012) 249-254; X. Zeng, X. Zhang, M. Yang, Y. Qi, *A facile hydrothermal method for the fabrication of one-dimensional $MoO_3$ nanobelts*, Mater. Lett., 112 (2013) 87-89; W.-S. Kim, H.-C. Kim, S.-H. Hong, *Gas sensing properties of MoO3 nanoparticles synthesized by solvothermal method*, J. Nanopart. Res, 12 (2010) 1889-1896; A. Michailovski, J. D. Grunwaldt, A., Baiker, R. Kiebach, W. Bensch, G. R. Patzke, *Studying the solvothermal formation of $MoO_3$ fibers by complementary in situ EXAFS/EDXRD techniques*, Angew. Chem. Int. Ed. Engl., 44 (2005) 5643-5647; and A. Ganguly, R. George, *Synthesis, characterization and gas sensitivity of $MoO_3$ nanoparticles*, Bull. Mater. Sci, 30 (2007) 183-185, each incorporated herein by reference in their entirety. Nanostructured $MoO_3$ was synthesized by Chithambararaj et al. using ammonium heptamolybdate tetrahydrate (AHM) and concentrated nitric acid ($HNO_3$). See A. Chithambararaj, N. Sanjini, A. C. Bose, S. Velmathi, *Flower-like hierarchical h-$MoO_3$: new findings of efficient visible light driven nano photocatalyst for methylene blue degradation*, Catal. Sci. Tech., 3 (2013) 1405-1414, incorporated herein by reference in its entirety. It was then used for the photocatalytic degradation of methylene blue (MB) under visible light radiation. Fakhri et al. synthesized $MoO_3$ NPs by hydrothermal method. See A. Fakhri, P. A. Nejad, *Antimicrobial, antioxidant and cytotoxic effect of molybdenum trioxide nanoparticles and application of this for degradation of ketamine under different light illumination*, J. Photochem. Photobiol., 159 (2016) 211-217, incorporated herein by reference in its entirety. The photocatalytic property of $MoO_3$ NPs was studied under visible, UV and sunlight radiation for ketamine degradation. High efficiency was observed between sunlight and $MoO_3$ nanoparticles for the photocatalysis reaction.

$MoO_3$ NPs also showed antifungal activity against *Candida albicans* and *Aspergillus niger*, and high resistance to gram-negative and gram-positive bacteria. Moreover, $MoO_3$ has demonstrated outstanding cytotoxic effects on breast and lung cancer cell lines. Xu and Ni, successfully synthesized a zeolite-supported $Bi_2MoO_6$ with photocatalytic activity in visible light conditions. See X. Xu, Q. Ni, *Synthesis and characterization of novel Bi 2 $MoO_6$/NaY materials and photocatalytic activities under visible light irradiation*, Catal. Commun., 11 (2010) 359-363, incorporated herein by reference in its entirety. The catalyst displayed more than 90% degradation of methyl orange dye when exposed to visible light radiation. The increased surface area of $Bi_2MoO_6$ nanoparticles due to its small size on the zeolite surface with a low Si/Al ratio was found to lead to high photocatalytic activity.

Hollow fiber (HF) membranes are one among the emerging technologies in membrane separation. HF membranes are a class of artificial membranes containing an HF that acts as a semi-permeable barrier. Hollow fiber membranes have been used for several applications such as waste water treatment, desalination by RO, dye rejection, cell culture, medicine, tissue engineering, gas separation, hemodialysis and the removal of volatile organic compounds (VOCs) from water due to their selectivity and good productivity nature. See. C. Feng, K. Khulbe, T. Matsuura, A. Ismail, *Recent progresses in polymeric hollow fiber membrane preparation, characterization and applications*, Sep. Purif. Technol., 111 (2013) 43-71; S. K. Lim, L. Setiawan, T.-H. Bae, R. Wang, Polyamide-imide hollow fiber membranes crosslinked with amine-appended inorganic networks for application in solvent-resistant nanofiltration under low operating pressure, J. Membr. Sci., 501 (2016) 152-160; and Y. Chen, X. Hu, X. Hu, S. Zhang, Y. Zhang, *Polymeric hollow fiber membranes prepared by dual pore formation mechanism*, Mater. Lett., 143 (2015) 315-318, each incorporated herein by reference in their entirety. The properties of the HF membranes can be tailored through surface modification techniques such as polymer coating, photografting, plasma treatment, etc. See J. Macanas, L. Ouyang, M. L. Bruening, M. Muñoz, J.-C. Remigy, J.-F. Lahitte, *Development of polymeric hollow fiber membranes containing catalytic metal nanoparticles*, Catal. Today, 156 (2010) 181-186, incorporated herein by reference in its entirety. HF membranes with additives are being fabricated to tailor membrane morphology and provide desired properties. Adding inorganic nanoparticles into a polymer dope solution to prepare nanocomposite HF membranes has been an interesting approach to improve separation properties and provide composites having the advantages of both nanoparticles and organic membranes. Hence, membranes containing nanoparticles fused with a polymer have gained importance for water treatment. However, the study of molybdenum nanoparticles as an additive in membrane fabrication has not been reported for transition metals.

Prior work has involved the use of membranes incorporating metal oxides, see CN 104226129 A, CN 1031700260B, DE 10201785 C1, Liu, et al. Int. J. Hydrogen Energy 42(7); 4208-4215 (2017), and Richards, et al., J. Surf. Engin. Materials and Adv. Technol. 2:183-193 (2012). However, the advantages attained by composite hollow fiber membranes containing $MoO_3$ nanoparticles including their superior photocatalytic, adsorptive and antifouling properties, as well as their convenience and economy compared to materials containing costly or difficult to handle oxides was not realized.

Taking into account the limitations of prior water purification methods and hollow-fiber membranes that do not contain $MoO_3$, the inventors investigated ways to incorporated $MoO_3$ nanoparticles into and/or onto a water-treatment membrane and evaluate their effects on water purification especially with regard to removal of toxic heavy metal ions and dyes. Unlike toxic metal oxides, $MoO_3$ is non-toxic to humans and is considered an essential trace element.

It is therefore an objective of the present disclosure to describe the formation of composite membranes containing $MoO_3$ nanoparticles, for example synthesized by a hydrothermal technique and characterized using scanning electron microscopy (SEM), X-ray diffraction (XRD), zeta potential and particle size analyzer. Composite polyphenylsulfone membranes encrusted with or incorporating various amounts of $MoO_3$ nanoparticles were characterized using SEM and their capacities to reject toxic metal ions, degrade dyes, and to resist biofouling were evaluated.

BRIEF SUMMARY OF THE INVENTION

The invention is directed to a composite hollow fiber (HF) membrane that contains molybdenum trioxide ($MoO_3$) nanoparticles. In one embodiment the composite membrane is made by dry-wet spinning and contains polyphenylsulfone hollow fibers that are encrusted or incorporating with MoO₃ nanoparticles. Composite membranes containing MoO₃ exhibit superior hydrophilicity and permeability compared to pristine membranes, adsorb heaving metals such as lead and cadmium, photocatalytically degrade dye, and have enhanced antifouling properties.

BRIEF DESCRIPTION OF THE DRAWINGS

FIG. 12A shows Zeta potential (FIG. 12A) and particle size of MoO₃ nanoparticles
FIG. 12B (S1) shows Zeta potential (FIG. 12A) and particle size of MoO₃ nanoparticles.
FIG. 13 (S2/S3) Membrane strips pre-dipped in *Staphylococcus aureus* culture was placed on the agar plates. (1) Colonies of *Staphylococcus aureus* around the control strip, (2) M 2 and (3) M 3 membrane strip with no colonies respectively

DETAILED DESCRIPTION OF THE INVENTION

Figure 1A:
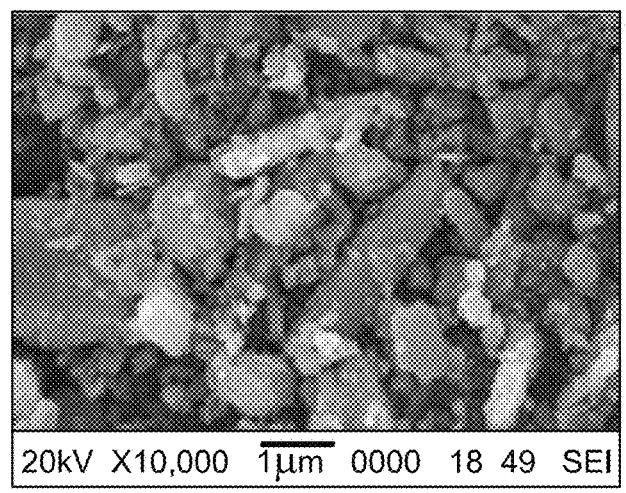
FIG. 1A is an SEM image of MoO₃ nanoparticles.

Molybdenum trioxide (MoO₃) is chemical compound with the formula MoO₃. It occurs as the rare mineral molybdite and is often used as an oxidation catalyst or as a raw material for the production of molybdenum metal. The oxidation state of molybdenum in this compound is +6.

MoO₃ nanoparticles (NP) have an average particle size ranging from 1 nm to <1,000 nm, which range includes all intermediate values and subranges, such as 1, 2, 5, 10, 15, 20, 25, 30, 35, 40, 45, 50, 60, 70, 75, 100, 150, 200, 250, 300, 350, 400, 450, 500, 550, 600, 650, 700, 750, 800, 850, 900, 950, and <1,000 nm (transmission electron microscopy, TEM). Preferably, the average size of the MoO₃ nanoparticles range in average size 75 to 500 nm (TEM). MoO₃ content in a composite hollow fiber membrane may range from 0.01 to 25 wt %. Preferably, the content of MoO₃ nanoparticles contained on or in a hollow fiber membrane will range from about 0.5 to about 3 wt %, advantageously from about 1.5 to about 2.5 wt %, based on the total weight of a membrane and the nanoparticles.

These nanoparticles are distinguishable from MoO₃ in other structural or compositional forms because they exhibit photocatalytic and adsorptive properties. For example, photocatalytic degradation of dye by the MoO₃ nanoparticles is due to the large band gap of 2.8-3.0 eV, which lie in the visible light region, which is not the case for conventional forms of MoO₃ additives. The MoO₃ NPs have been found to exhibit good antifungal activity against *Candida albicans* and *Aspergillus niger*, and high resistance to gram-negative and gram-positive bacteria. This is not the case for conventional MoO₃ particles.

PPSU—Polyphenylsulfone. One example is Radel R-5000 having an average Mw~50,000 g mol$^{-1}$. Other examples are PPSUs having average molecular weights such as 10,000, 25,000, 50,000, 75,000, 100,000, 150,000 or 200,000 g mol$^{-1}$ or any intermediate value within this range. This term includes homopolymers and copolymers comprising a monomers depicted below:

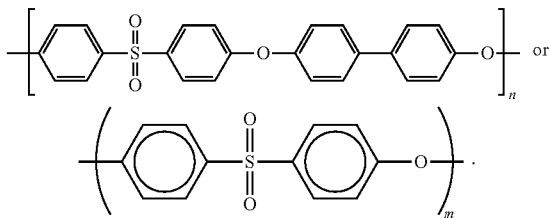

wherein m and n are integers. The rings may be substituted provided that this does not substantially affect their capacity to form hollow fiber membranes. Examples of substituents include halogens (F, Cl, Br, I), C₁-C₆ alkyl and hydroxyl or C₁-C₆ alkoxy. In some instances, these monomers may be linked through alkene groups such as methylene (—CH₂— or —CR₂) in polysulfone (PSU). These linkages may be further substituted at R, for example, with halogens (F, Cl, Br, I), C₁-C₆ alkyl and hydroxyl or C₁-C₆ alkoxy. Useful polymers are also described by "The properties of Ultrason®" incorporated by reference to https://_www.basf.com/documents/cn/en/chinaplas/Ultrason_brochure.pdf (last accessed Sep. 19, 2017). Dry-wet spinning includes but is not limited to the methods described and incorporated by reference, for example, to E. Yuliwati, A. F. Ismail, T. Matsuura, M. A. Kassim, M. S. Abdullah, Effect of modified PVDF hollow fiber submerged ultrafiltration membrane for refinery wastewater treatment. Desalination, 283 (2011) 214-220. In some embodiments, a hollow fiber membrane may be produced using one or more of polyethersulfone (PESU), sulfonated polyethersulfone, polysulfone (PSU), sulfonated polysulfone, polyphenylsulfone (PPSU), or sulfonated polyphenylsulfone or block copolymers thereof as a core polymer, where a core polymer refers to a main component whose content exceeds that of any other individual polymeric components of a hollow fiber membrane. Preferably, the core component is PPSU as exemplified herein. Representative, but non-limiting, doping solutions containing 0.1, 1, 2 or 3 wt % MoOc nanoparticles are described in Table 1 below and in the Examples. Those skill in the art may formulate other doping solutions for dry-wet spinning of composite membranes, for example, having different amounts of solvent, pore forming agents, MoO₃ nanoparticles, and PPSU or other core polymer components.

Unless otherwise stated, the molecular weights of polymers are given as Mw values, in particular determined via gel permeation chromatograph (GPC) in DMAc (dimethylacetamide).

The entire dry-wet spinning process may be performed at room temperature (about 25° C.). For example, it may be performed at a temperature of more than 0, 10, 15, or 20° C. and less than 30, 40, 50, 60, 70, 80, 90 or 100° C. and thus is more convenient and economical than wet-melt or dry processes requiring elevated temperatures up to 400° C. in the dry-wet process dope solution prepared in an organic solvent (such as N-methyl-2-pyrrolidone, NMP), which contains one or more polymers like PPSU and $MoO_3$ nanoparticles and, optionally, a pore former such as polyethylene glycol ("PEG"), passes through a spinneret placed about 5 cm above a coagulation bath containing a nonsolvent for the polymer (e.g., a water bath) at an angle of about 90°. The organic dope solution is extruded through the spinneret into the coagulation bath, where the organic solvent and nonsolvent of the coagulation bath demix, resulting in precipitation of hollow fiber membranes in the coagulation bath. This process results in high porosity as well as microvoid formation in the hollow fiber membrane unlike other spinning methods which produce non-porous fibers lacking substantial porous structure.

Surface roughness of the composite hollow fiber membrane of the invention may be determined using atomic force microscopy as disclosed in the Examples. In some embodiments, surface roughness will range from about 10 to about 30 $R_a$ (nm) or from about 14 to about 33 $R_q$ (nm), where $R_a$ is average surface roughness and $R_q$ is root mean square surface roughness. The ranges above include all intermediate values and subrange.

"Porous surface layer" refers to a polymeric surface comprising plurality of pores of same or different sizes. "Porous separation membrane" refers to a membrane comprising a polymeric surface comprising plurality of pores of same or different sizes. "Separation" may, in particular, be understood as "filtration". "Membranes for water treatment" are generally semi-permeable membranes which allow for separation of dissolved and suspended particles and water, wherein the separation process itself can be either pressure-driven or electrically driven A Membrane bioreactor (MBR) is a combination of a membrane process like microfiltration or ultrafiltration with a biological wastewater treatment process, the activated sludge process, it is now widely used for municipal and industrial wastewater treatment; see S. Judd, The MBR book (2006) Principles and applications of membrane bioreactors in water and wastewater treatment, Elsevier, Oxford ISBN 1856174816 (incorporated by reference).

Examples of membrane applications are pressure-driven membrane technologies such as microfiltration (MF; pore size about 0.08 to 2 µm, for separation of very small, suspended particles, colloids, bacteria), ultrafiltration (UF; pore size about 0.005 to 0.2 µm; for separation of organic particles>1000 MW, viruses, bacteria, colloids), nanofiltration (NF, pore size 0.001 to 0.01 µm, for separation of organic particles>300 MW Trihalomethan (THM) precursors, viruses, bacteria, colloids, dissolved solids) or reverse osmosis (RO, pore size 0.0001 to 0.001 µm, for separation of ions, organic substances>100 MW).

Membrane fouling is a process whereby a solution or a particle is deposited on a membrane surface or in membrane pores in a process such as in a Membrane bioreactor, so that the membrane's performance is degraded. It is a major obstacle to the widespread use of this technology. Membrane fouling can cause severe flux decline and affect the quality of the water produced. Severe fouling may require intense chemical cleaning or membrane replacement. This increases the operating costs of a treatment plant. There are various types of foulants: colloidal (clays, flocs), biological (bacteria, fungi), organic (oils, polyelectrolytes, humics) and scaling (mineral precipitates). Fouling can be divided into reversible and irreversible fouling based on the attachment strength of particles to the membrane surface. Reversible fouling can be removed by a strong shear force or backwashing. Formation of a strong matrix of fouling layer with the solute during a continuous filtration process will result in reversible fouling being transformed into an irreversible fouling layer. Irreversible fouling is the strong attachment of particles which cannot be removed by physical cleaning. Flux, transmembrane pressure (TMP), permeability and resistance are the best indicators of membrane fouling. Under constant flux operation, TMP increases to compensate for the fouling. On the other hand, under constant pressure operation, flux declines due to membrane fouling. Membrane fouling in some of the Examples is measured by a flux decline ratio (FDR) or flux recovery ratio (FRR). In some embodiments of the invention membrane fouling is quantified using the above-described parameters of FDR and/or FRR.

Membranes can be cleaned physically, biologically or chemically. Physical cleaning includes intermittent permeation, membrane backwashing, backflushing using a permeate, sonically, or use of tools such as sponges, air jets or water jets. Biological cleaning uses biocides to remove, denature and/or inactivate viable microorganisms, whereas chemical cleaning involves the use of acids and bases to remove foulants and impurities. In some embodiments of the invention a membrane according to the invention may be further cleaned using at least one of these methods when flux declines to 1, 2, 3, 4, 5, 10, 20, 30, 40, 50, 60, 70, 80, 90, 95, 99 or <100% (or any intermediate value within this range) of the flux through a new or unused membrane of the same type, for example, it may be periodically cleaned, backflushed or backwashed with pressurized air, water, permeate, or a chemical cleaning composition.

Photocatalytic degradation includes the exposure of a compound, such as methylene blue or other dye, to photons such as solar radiation, UV or visible light. In some embodiments, employed to degrade a dye or other undesired chemical such as toxic chemicals found in residential, commercial, industrial waste or medical wastes, for example, a dye may be chemically decomposed or made non-toxic or adsorb able to a membrane by exposure to photonic or ultrasonic radiation. Ultrasonic sound is beyond the audible range and relate to sound waves having a .frequency of more than 20,000, 30,000, or 40,000 Hz (or any intermediate values within this range).

Dyes include but are not limited to methylene blue or the other dyes susceptible to photonic degradation such as those described and incorporated by reference to Reza, et al. Applied Water Science July 2017, Volume 7, Issue 4, pp 1569-1578. Relative degradation or removal of a dye from waste water or another contaminated source may be measure with respect to otherwise identical hollow fiber membranes not containing $MoO_3$ nanoparticles (e.g., with no $MoO_3$ or with $MoO_3$ that is not in the form of nanoparticles such as those less than 1 nm or greater than 1,000 nm) or to hollow fiber membranes containing $MoO_3$ not made by dry-wet spinning.

EMBODIMENTS

The following embodiments illustrate various aspects of the present invention. They are not to be construed to limit the claims in any manner whatsoever.

An aspect of the disclosure relates to a hollow-fiber (HF) membrane comprising nanoparticles of molybdenum trioxide ("$MoO_3$"), wherein the nanoparticles range in average particle size from about 75 nm to about 500 nm, preferably from about 266±87 nm in average particle size. In this embodiment, the porosity of the membrane may range from about 20-80%, preferably from about 35 to 60%, and more preferably from about 40 to 56%, The mean pore size of this membrane may range from about 1 to 50 nm, preferably from about 5 to 15 nm, and more preferably from about 6 to 12 nm. The hollow fiber membrane of may have an average surface roughness ranging from about 5 to 50, preferably from about 10 to 30 $R_a$ (nm) and more preferably from about 12-24. The ranges given above include all intermediate values and subranges.

In some embodiments, the hollow fiber membrane as described by one or more embodiments or parameters above will comprise about 0.1 to 50 wt %, preferably from 1 to 15 wt % and more preferably from 1.5 to 2.5 wt % of the $MoO_3$ nanoparticles based on total weight of the membrane and nanoparticles. These ranges given above include all intermediate values and subranges.

The $MoO_3$ nanoparticles are embedded, encrusted, coated or otherwise associated with the hollow fiber membrane, for example, as shown by FIG. 4.

In some embodiments the composite hollow fiber membrane comprises longer elongated finger-like projections than those in an otherwise identical hollow fiber membrane produced without $MoO_3$ nanoparticles and may also comprise a spongy sublayer between arrays of fingerlike projections as shown in FIG. 4. Preferably the fingerlike projections have an average length that is from 1.5-5 times the average thickness of the sublayer which is based on the average thickness at troughs between fingerlike projections.

In a preferred and exemplified embodiment the hollow-fiber membrane comprises polyphenylsulfone (PPSU), preferably as a core or primary polymer component. In other embodiments, one or more other compatible polymers may serve as core polymer components or as auxiliary polymer components.

In most embodiments, the hollow-fiber membrane is made by dry-wet spinning as described herein. The content of $MoO_3$ nanoparticles and polymer in the doping solution may vary, various amounts of an organic solvents may be used in the dope solution, and various non-organic solvents that precipitate the dope solution may be used in the coagulation bath. These include water and other aqueous solutions. An increase in the content of $MoO_3$ particles or polymer may increase the viscosity of a dope solution and affect is rheological and pore-forming properties as can the concentration of a pore former like PEG100. Consequently, the concentration of these ingredients or that of an organic solvent (e.g., NMP) in the dope solution may be adjusted to produce a desired degree of porosity in a composite hollow fiber membrane, such as a degree of porosity or surface roughness described herein.

In some embodiments, the content of $MoO_3$ nanoparticles in the dope solution will range from 0.1 to 25 wt % (e.g., about 0.1, 0.2, 0.5, 1, 2, 3, 4, 5, 10, 15, 20, 25, or any intermediate value in this range), the content of a polymer, such as PPSU will range from 1 to 50 wt % (e.g., about 1, 2, 3, 4, 5, 10, 15, 20, 30, 40, 50 or any intermediate value in this range), the content of a pore former such as PEG-1000 will range from 0.1-50 wt % (e.g., about 0.1, 1, 2, 3, 4, 5, 10, 15, 20, 30, 40, 50 or any intermediate value in this range), with the organic solvent content to volume taking into consideration all ingredients and additives to the dope solution. The ingredients of the dope solution will be admixed in quantities providing a dope solution suitable for extrusion through a spinneret.

In some embodiments the spinneret used for dry-wet process described herein will range in outer diameter from 0.25, 0.5, 1.0, 1.1, 1.15, 1.2, 1.25, 1.3, 1.4, 1.5, 1.6, 1.7, 1.8, 1.9, 2.0, 2.25, 2.5, 3.0 and inner diameter from 0.1, 0.15, 0.2, 0.25, 0.5, 1.0, 1.1, 1.15, 1.2, 1.25, 1.3, 1.4, 1.5, 1.6, 1.7, 1.8, 1.9, or 2.0, where outer diameter>inner diameter. Preferably, the spinneret will have an outer diameter/inner diameter of 1.15 mm±10, 20 or 30%/0.55 mm±10, 20 or 30%

In many embodiments, the hollow-fiber membrane of the invention will exhibit a higher hydrophilicity than an otherwise identical hollow-fiber membrane not made with dry-wet spinning and/or will exhibit a higher permeability than an otherwise identical hollow-fiber membrane not made with dry-wet spinning.

Other embodiments of the invention concern the use of the composite hollow-fiber membrane of the invention for removing heavy metals such as lead or cadmium by adsorption or in conjunction with photocatalysis of dyes and their removal, for example, by adsorption or conversion to less harmful chemical products. These methods generally involve passing or filtering an aqueous solution containing a contaminant such as a heavy metal or dye through the composite hollow fiber membrane of the invention. In many embodiments of the invention the aqueous solution containing one or more contaminants will be industrial waste water.

In embodiments involving removing or photodegrading a dye in an aqueous solution the contaminant is exposed to visible light or UV irradiation (or ultrasonic energy) before, after or while in contact with the composite hollow fiber membrane, preferably as it comes into contact with the membrane.

Another embodiment involves use of the membrane in situations where a membrane becomes fouled, for instance by the attachment or proliferation of microorganisms.

Another embodiment of the invention is an apparatus for treating wastewater or other contaminated aqueous solutions using membrane bioreactor comprising the composite hollow fiber membrane as described herein.

EXAMPLES

The following examples illustrate various aspects of the present invention. They are not to be construed to limit the claims.

Example 1

Synthesis of $MoO_3$ Nanoparticles

The $MoO_3$ nanoparticles were synthesized by hydrothermal method. The ammonium heptamolybdate tetrahydrate (AHM) (2.3 g) was dissolved in 10 mL of deionized water to give 0.2 M solution. It was then stirred at room temperature for 15 min and 5 mL of 1.5 M $HNO_3$ was slowly added to the AHM solution. It was then transferred into a Teflon-lined stainless steel autoclave and the reaction was carried out at 120° C. for 12 h. The precipitate formed were centrifuged and washed with distilled water, then dried in a vacuum at 70° C. for 6 h. See K. Krishnamoorthy, M.

Veerapandian, K. Yun, S. J. Kim, *New function of molybdenum trioxide nanoplates: toxicity towards pathogenic bacteria through membrane stress,* Colloids and Surfaces B: Biointerfaces, 112 (2013) 521-524; and A. Manivel, G.-J. Lee, C.-Y. Chen, J.-H. Chen, S.-H. Ma, T.-L. Horng, J. J. Wu, *Synthesis of MoO$_3$ nanoparticles for azo dye degradation by catalytic ozonation,* Mater. Res. Bull., 62 (2015) 184-191, each incorporated herein by reference in their entirety. Materials described in the Examples were sourced as follows: Polyphyenylsulfone ("PPSU") Radel R-5000 of an average Mw~50,000 g mol$^{-1}$ was procured from Solvay Advanced Polymer (Belgium). Ammonium heptamolybdate tetrahydrate, cadmium nitrate tetrahydrate, lead nitrate, methylene blue (MB) (Mw~373.9 g/mol) bovine serum albumin (BSA), polyethylene glycol (PEG-1000) were procured from Sigma-Aldrich and used without any further purification. N-methyl-2-pyrrolidone (NMP) was provided from QREC, Malaysia. Nitric acid (69%) was purchased from Merck. The nutrient agar used to carry out the antibiofouling testing was bought from Sisco Research Laboratories (SRL) Pvt. Ltd. India.

Example 2

Characterization of MoO$_3$ Nanoparticles

The crystal structure of synthesized MoO$_3$ nanoparticles was established using analytical Empyrean Series 2 X-ray diffractometer for a range of 5-75°. The scan rate of 0.1°/min with CuKα radiation as X-ray source at 60 kV was maintained. The particle size and charge of the MoO$_3$ nanoparticle was measured using particle and zeta potential analyzer (Horiba SZ 100). The zeta potential and particle size were obtained by scattering dynamic light at angle 90° onto MoO$_3$ NPs dispersed in ultrapure water with pH adjusted to 7 at 25° C. The scanning electron microscopic analysis was performed to demonstrate the morphology and size of the MoO$_3$ nanoparticles. Here, the SEM images of powder MoO$_3$ NP sample placed on the carbon tape and sputtered with gold was taken using scanning electron microscope (SEM) (JEOL JSM-6380L) at 20 kV. Bruker alfa FTIR Spectrometer was used to record the Fourier transform infrared (FTIR) spectra of MoO$_3$ NPs for the range of 500-4000 cm$^{-1}$.

Hydrodynamic size and zeta potential of the MoO$_3$ NPs. The hydrodynamic diameter and surface charge of MoO$_3$ NPs were measured by dispersing NPs in water media using particle size and zeta potential analyzer. The particle size observed is higher than the actual size due to the hydration sphere formation. FIG. 12B shows that the MoO$_3$ NPs have a broad range of size distribution with the mean diameter value of 266.0±86.7 nm. FIG. 12A displays the zeta potential value of MoO$_3$ nanoparticles, with a z-potential of −62.2 mV at neutral pH. The negative charge of the MoO$_3$ NPs is because of the presence of an excess of OH absorbed on the surface of MoO$_3$ NPs. Large zeta potential value makes the MoO$_3$ NPs stable because the repulsion between the like-charged particles in the suspension results in fewer agglomerations.

Figure 1B:
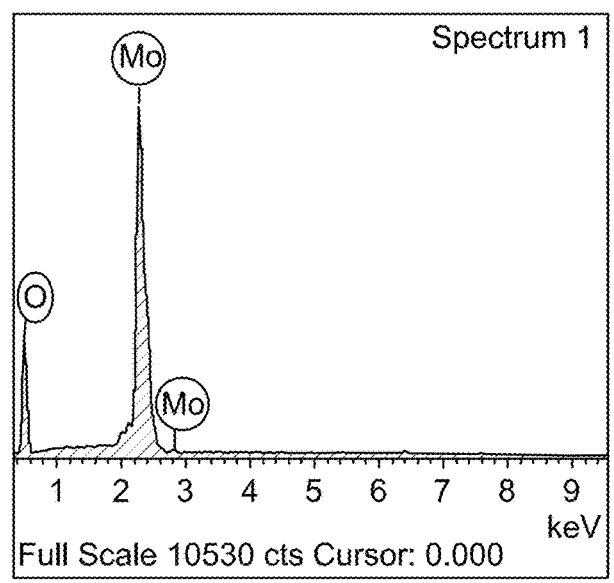
FIG. 1B an EDS spectrum of MoO₃ nanoparticles.

Scanning Electron Microscopy (SEM) and X-Ray Diffraction Spectroscopy (XRD). The SEM shows the particle morphology of the MoO$_3$ NPs in FIG. 2. The SEM image was taken at 1 μm scale. From the SEM image, one can observe that the particles are of rectangular shape and with a wide range of particle size in correlation with the results obtained from particle size analyzer. The energy dispersive spectroscopy (EDS) of MoO$_3$ NPs is showed in FIG. 1B. The energy EDS confirmed the purify and elemental composition of MoO$_3$ nanoparticles (FIG. 1A).

Figure 2:
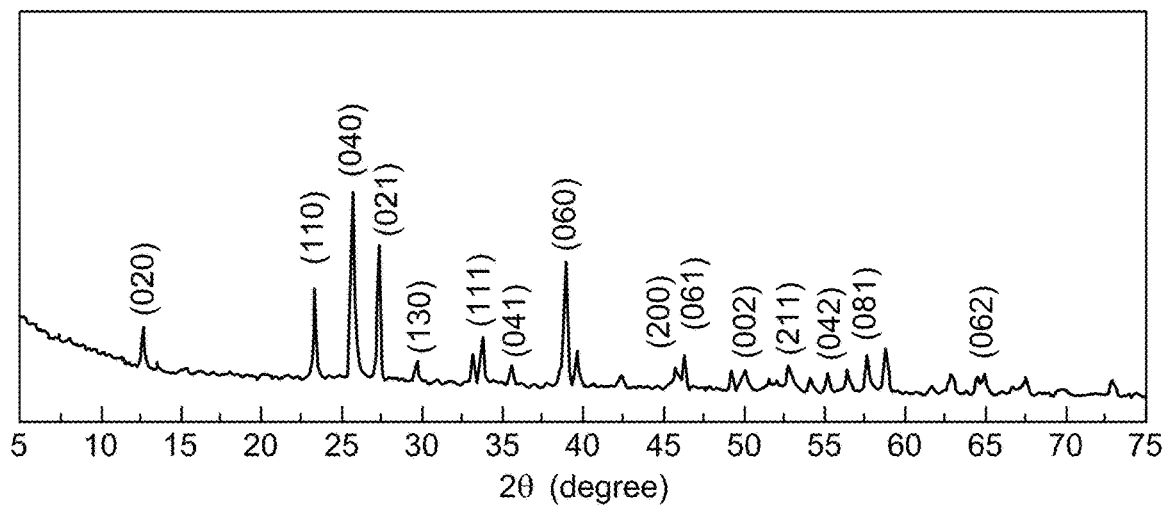
FIG. 2 depicts a XRD of αMoO₃ nanoparticles.

Powder XRD was carried out to study the crystallinity of the synthesized the MoO$_3$ NPs. The FIG. 2 shows the peaks corresponding to the orthorhombic phase of α-MoO$_3$ NPs.

The peak at 2θ of 12.6° indicates the presence of the orthorhombic crystal symmetry of the plane (020). Further, the appearance of the peak corresponding to planes (110), (040), (021), (111), and (060) reveal the orthorhombic phase.

Figure 3:
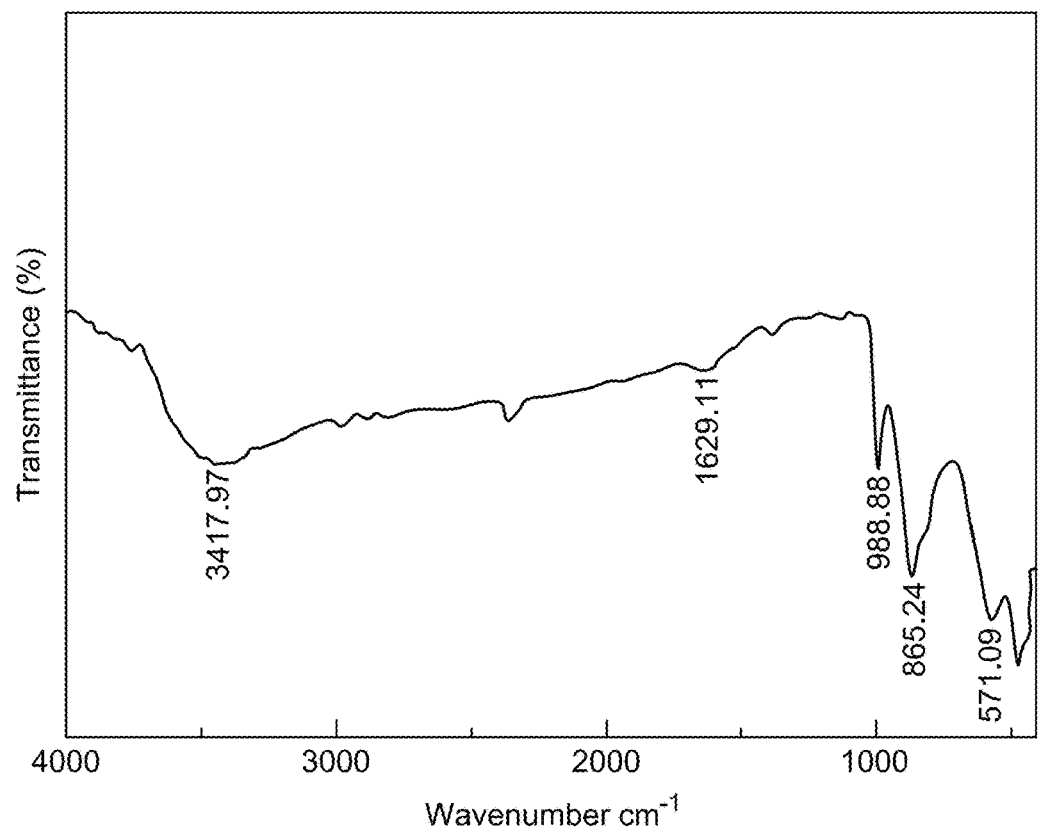
FIG. 3 shows an FTIR spectrum of MoO₃ nanoparticles.
Figure 4A:
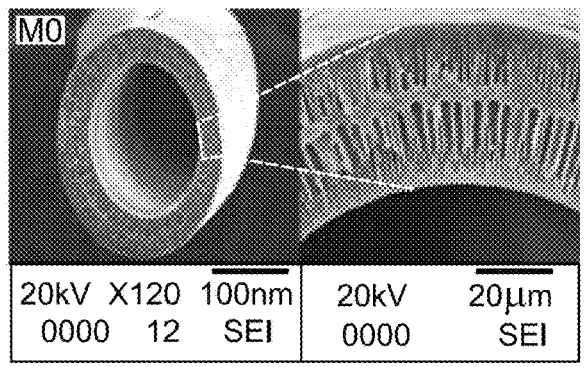
FIGS. 4A, 4B, 4C and 4D show SEM Cross-sectional images of M0, M1, M2 and M3, respectively.
Figure 4B:
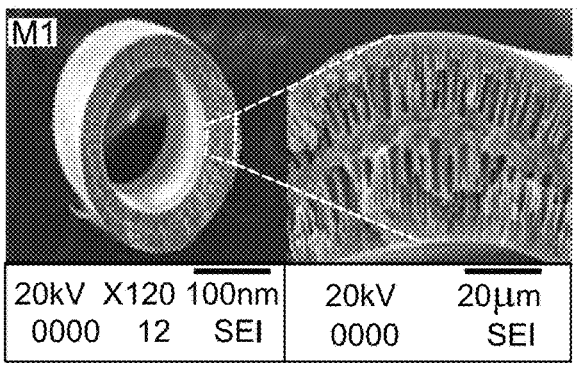
Figure 4C:
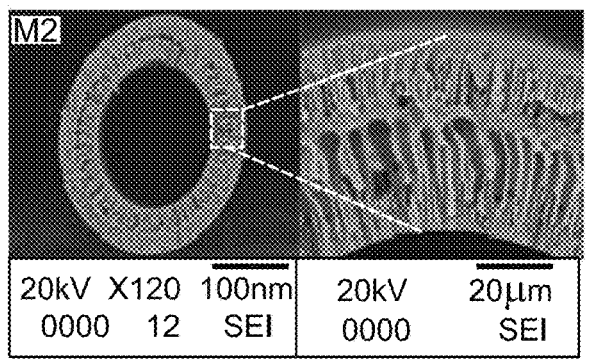
Figure 4D:
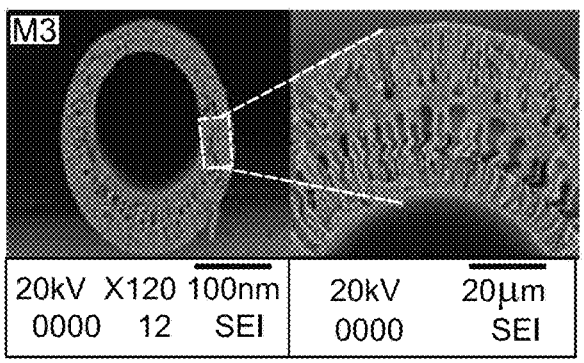
Figure 5C:
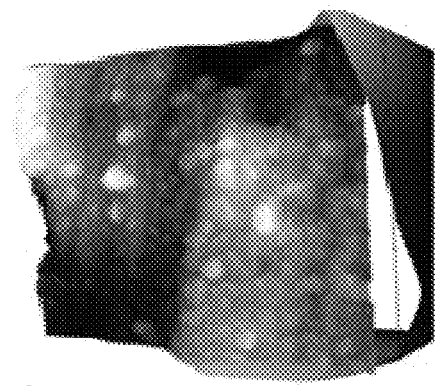
FIGS. 5A, 5B, 5C, 5D, 5E and 5F respectively show 2D and 3D AFM images of HF membranes
Figure 5F:
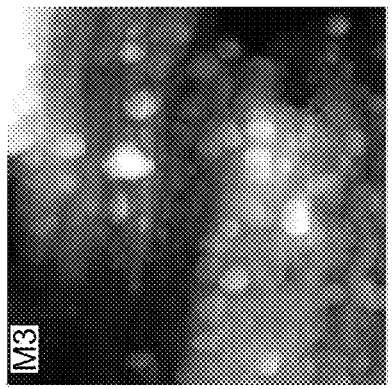
Figure 5B:
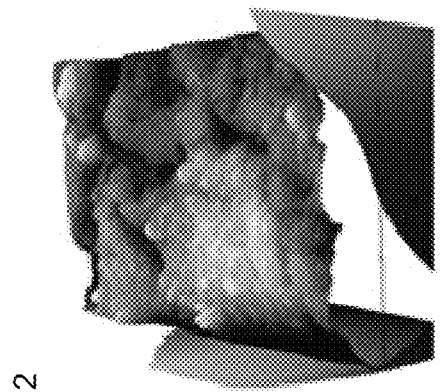
Figure 5E:
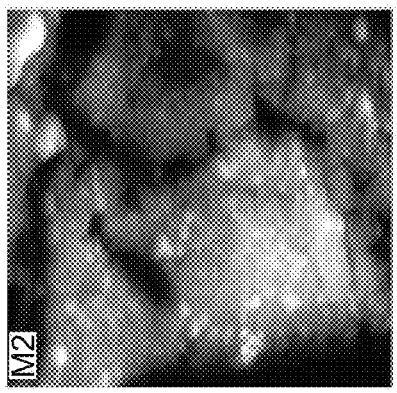
Figure 5A:
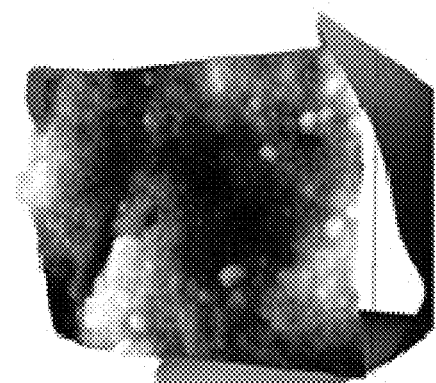
Figure 5D:
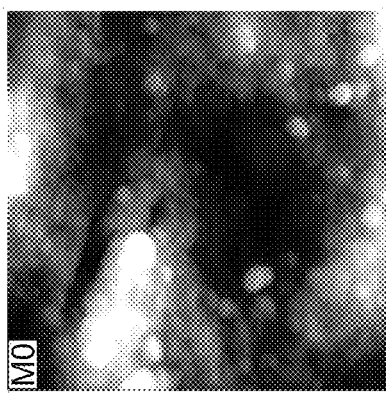

Fourier transform infrared (FTIR) analysis. FIG. 3 shows the FT-IR spectrum of MoO$_3$ NP scanned in the range of 4000-400 cm$^{-1}$. The major absorption bands at 571 cm$^{-1}$, 865 cm$^{-1}$, 988 cm$^{-1}$ and 1629 cm$^{-1}$ were observed in the spectrum. The bending vibration of the Mo—O—Mo was displayed by the presence of band situated at 571 cm$^{-1}$, where each O$^{-2}$ ion is shared by three Mo$^{6+}$ ions. See G. A. Nazri, C. Julien, Far-infrared and Raman studies of orthorhombic MoO$_3$ single crystal, Solid Slate Ionics, 53 (1992) 376-382, incorporated herein by reference in its entirety. The absorption band at 865 cm$^{-1}$ and 988 cm$^{-1}$ is ascribed to the Mo—O—Mo vibration of Mo$^{6+}$ and terminal Mo═O stretching vibration mode respectively. See W. Dong, B. Dunn, Sol-gel synthesis of monolithic molybdenum oxide aerogels and xerogels, J. Mater. Chem., 8 (1998) 665-670, incorporated herein by reference in its entirety. A broad band at 3417 cm$^{-1}$ was spotted due to —OH stretching vibration of water associated in the MoO$_3$ NPs. See Y. Chen, C. Lu, L. Xu, Y. Ma, W. Hou, J.-J. Zhu, Single-crystalline orthorhombic molybdenum oxide nanobelts: synthesis and photocatalytic properties, Cryst. Eng. Comm., 12 (2010) 3740-3747, incorporated herein by reference in its entirety. The bending vibration of OH group of water adsorbed in the MoO$_3$ NP was displayed by weak peak, at 1629 cm$^{-1}$.

The bending vibration of the Mo—O—Mo was displayed by the presence of band situated at 571 cm$^{-1}$, where each O$^{-2}$ ion is shared by three Mo$^{6+}$ ions. The absorption band at 865 cm$^{-1}$ and 988 cm$^{-1}$ is ascribed to the Mo—O—Mo vibration of Mo$^{6+}$ and terminal Mo═O stretching vibration mode respectively. A broad band at 3417 cm$^{-1}$ was spotted due to —OH stretching vibration of water associated in the MoO$_3$ MPs. The bending vibration of OH group of water adsorbed in the MoO$_3$ NP was displayed by weak peak at 1629 cm$^{-1}$.

Example 3

Preparation of Hollow Fiber Membranes

Dope solution: Dry PPSU polymer was used as core polymer and different composition of MoO$_3$ nanoparticles was used for the HF membrane fabrication (Table 1). The MoO$_3$ nanoparticles were dispersed in the solvent NMP with probe sonicator at 40 KHz for 15 min. The polymer PPSU and pore former PEG-1000 was added subsequently and stirred at 50° C. at 500 rpm for 24 h to concoct the dope solutions. See E. Yuliwati, A. F. Ismail, T. Matsuura, M. A. Kassim, M. S. Abdullah, Effect of modified PVDF hollow fiber submerged ultrafiltration membrane for refinery wastewater treatment, Desalination, 283 (2011) 214-220, incorporated herein by reference in its entirety. The air bubbles trapped in the dope solution were removed by ultrasonication. The Basic viscometer (Model: EW-98965-40, COLE PARMER, 20-2 million centipoises) was used to record the viscosity of the prepared polymer dope solutions.

TABLE 1

Composition of the dope solution

| Membrane Code | PPSU (Wt. %) | MoO$_3$ NPs (Wt. %) | PEG-1000 (Wt. %) | NMP (Wt. %) |
|---|---|---|---|---|
| M 0 | 20 | 0 | 5 | 75 |
| M1 | 20 | 1 | 5 | 74.0 |
| M2 | 20 | 2 | 5 | 73.0 |
| M3 | 20 | 3 | 5 | 72.0 |

Example 4

Hollow Fiber (HF) Membrane Fabrication

The dry-wet spinning technique was used for the fabrication of HF membranes. Table 2 elucidates the parameters exercised for spinning. The spinneret was placed 5 cm above the coagulant bath at an angle of 90°. The dope solution was extruded into the coagulation bath through the spinneret to produce the HF membranes. The solvent trapped in the fibers was removed by soaking the HF membranes in the water bath for 24 h. The pore shrinkage was constrained by post-treatment of HF membranes with 10% glycerol solutions for one day. It was then dried in air at room temperature for 48 h before further characterization.

TABLE 2

Hollow fiber spinning parameters

| Dope composition | PPSU/PEG/MoO$_3$/NMP |
|---|---|
| | PPSU/PEG/NMP (For Neat) |
| Dope Extrusion Rate (DER) | 3 mL/min |
| Bore fluid | Distilled water |
| Bore Extrusion Rate (BER) | 1.5 mL/min |
| Air gap | 5 cm |
| Spinneret Dimension (o.d/i.d) | 1.15/0.55 (mm) |

Example 5

Characterizations of HF Membrane Morphological Study

A scanning electron microscope (JEOL JSM-6380L) was used to study the morphology of the HF membrane. The HF membrane was frozen using liquid nitrogen, then fractured and gold sputtered to get the cross-sectional image. See R. Kumar, A. M. Isloor, A. F. Ismail, T. Matsuura, *Performance improvement of polysulfone ultrafiltration membrane using N-succinyl chitosan as additive*, Desalination, 318 (2013) 1-8, incorporated herein by reference in its entirety.

Morphological Study of the MoO$_3$ NPs incorporated HF Membrane. Scanning Electron Microscopy (SEM). The cross-sectional images of hollow fiber membranes fabricated by incorporation of MoO$_3$ NPs are shown in FIG. 4. The cross section showed spongy sublayer found in between the finger-like projections formed due to phase inversion occurring at inner and outer surfaces of the hollow fibers. See Z.-L. Xu, F. A. Qusay, *Polyethersulfone (PES) hollow fiber ultrafiltration membranes prepared by PES/non-solvent/NMP solution*, J. Membr. Sci., 233 (2004) 101-111, incorporated herein by reference in its entirety. The addition of MoO$_3$ nanoparticles improved the porous nature in the skin with elongated finger-like projection when compared to that of pristine polyphenylsulfone hollow fibers. A greater affinity to water by MoO$_3$ NPs increases the diffusion velocity of nonsolvent in a nascent membrane during phase inversion.

The viscosity of the polymer dope solution increased with the rise in the concentration of MoO$_3$ NPs in the dope solution as seen in Table 4. The viscosity of the dope solution affects the rheological property during liquid-liquid demixing. Where, increased viscosity decreases the mass transfer rate, preventing the formation of macroporous structure. Hence the length of the finger-like projections decreased with an increase in the concentration of MoO$_3$ nanoparticles. See H. Dzinun, M. H. D. Othman, A. Ismail, M. H. Puteh, M. A. Rahman, J. Jaafar, *Morphological study of co-extruded dual-layer hollow fiber membranes incorporated with different TiO$_2$ loadings*, J. Membr. Sci. 479 (2015) 123-131, incorporated herein by reference in its entirety. The retention of MoO$_3$ nanoparticles on the membrane structure was performed by energy dispersive X-ray (EDX) study.

Atomic Force Microscopy (AFM). The topography of hollow fiber membrane surface was studied using AFM. The two-dimensional scans of the hollow fibers M0, M2, M3 are shown in FIG. 5. It was observed that the membrane roughness increased with the rise in addition of MoO$_3$ nanoparticles. This might be due to the increased pore size formed with higher content of MoO$_3$ NPs in the polymer matrix. The agglomeration of MoO$_3$ nanoparticles also caused a hike in surface roughness due to the formation of nodules or lumps on the surface of HF membranes. The trend was further supported by the surface roughness parameters measured in terms of mean roughness ($R_a$) and root mean square roughness ($R_q$) as given in Table 3.

TABLE 3

Surface roughness parameters of membranes.

| Membranes | $R_a$ (nm) | $R_q$ (nm) |
|---|---|---|
| M 0 | 11.74 | 17.73 |
| M 2 | 17.88 | 24.45 |
| M 3 | 24.6 | 28.2 |

Hydrophilicity

The membrane wettability, swelling nature, and hydrophilicity were understood by contact angle measurement. A drop of deionized water was placed on the surface of the HF membrane at 5 different spots and the images were taken of water droplet so as to record the static contact angle using contact angle goniometer (Model: OCA 15EC, Dataphysics) by the sessile drop method. See L.-Y. Yu, Z.-L. Xu, H.-M. Shea, H. Yang, Preparation and characterization of PVDF-SiO$_2$ composite hollow fiber UF membrane by sol-gel method, J. Membr. Sci., 337 (2009) 257-265, incorporated herein by reference in its entirety. The membrane swelling was measured by soaking the piece of dry HF membrane of 5 cm long in the water for 24 h and measuring the dry ($W_d$) and wet ($W_w$) weights of HF membrane. See V. R. Pereira, A. M. Isloor, A. Zulhairun, M. Subramaniam, W. Lau, A. Ismail, *Preparation of polysulfone-based PANI-TiO$_2$ nanocomposite hollow fiber membranes for industrial dye rejection applications*, RSC Adv., 6 (2016) 99764-99773, incorporated herein by reference in its entirety. The extent of swelling is estimated by the equation, $$\% \text{ swelling} = \left(\frac{W_w - W_d}{W_d}\right) \times 100 \quad (1)$$

Porosity and Mean Pore Radius ($r_m$) Measurement

The gravimetric technique was used to study the porosity (ε) of the membranes using following equation, $$\varepsilon(\%) = \left(\frac{W_w - W_d}{A l \rho}\right) \times 100, \quad (2)$$

where the and '$W_d$' and '$W_w$' are the membrane weight at dry and wet form respectively, 'A' is the effective area of the HF membrane, 'p' is the density of the water, 'l' is the membrane thickness.

The mean pore radius ($r_m$) of the HF membranes was evaluated by Guerout-Elford-Ferry equation given below.

$$r_m = \sqrt{\frac{(2.9 - 1.75\varepsilon) \times 8 \eta l Q}{\varepsilon \times A \times \Delta P}} \quad (3)$$

where 'η' is the viscosity of water, 'Q' is the volume of permeate per unit time (m³/s) and pressure 'ΔP' of 0.2 MPa.

Figure 6:
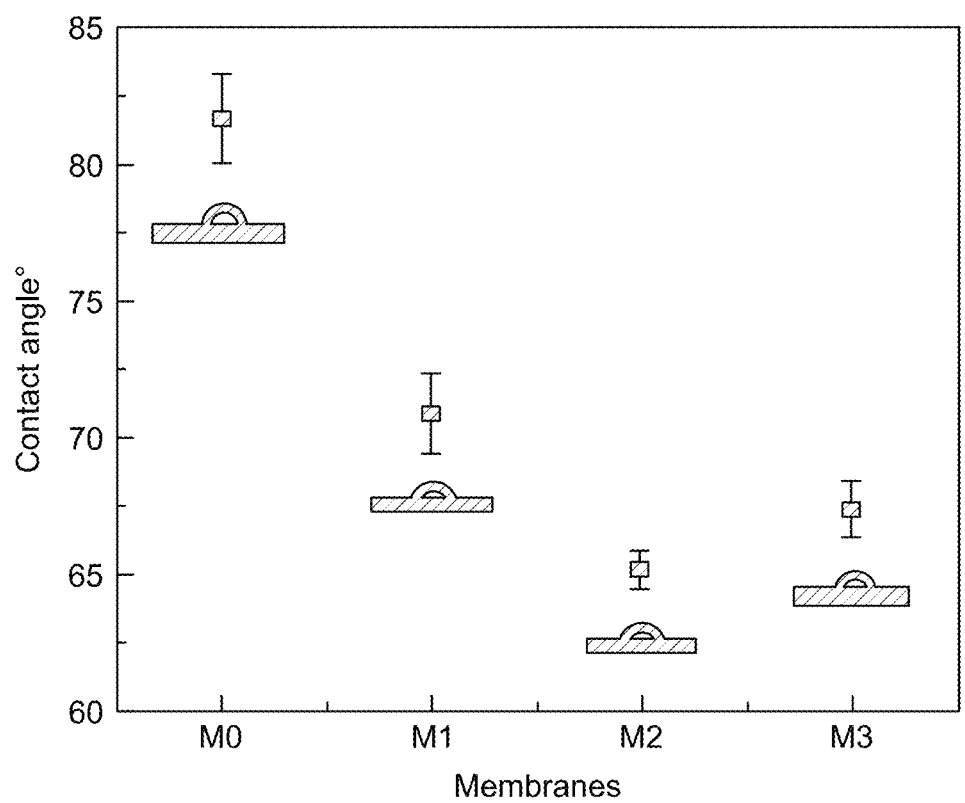
FIG. 6 depicts the contact angle of the hollow fiber membranes.

Hydrophilicity of the HF membranes. The hydrophilicity of membrane surface is a crucial factor which influences the membrane performance such as permeability and antifouling nature. The surface hydrophilicity is normally caused by water contact angle and swelling ability. FIG. 6 demonstrates the trend of the contact angle with the addition of $MoO_3$ NPs, where the contact angle declined with increase in concentration $MoO_3$ NPs. The hydrophilic $MoO_3$ NPs adsorbed and attached to the membrane surface administer its hydrophilic property, thereby enhancing the surface hydrophilicity of membrane.

The membrane hydrophilicity can be further evaluated using a degree of swelling in water. The percentage of swelling for the HF membrane increased with the incorporation of $MoO_3$ NPs in the dope solution (Table 4). This is because of the higher affinity of $MoO_3$ NPs towards the water. The hydroxyl groups present in the $MoO_3$ NPs make them hydrophilic. Hence draws water to the membranes. However, there is a slight decline in swelling percentage value when $MoO_3$ nanoparticles concentration was hiked from 2 wt % to 3 wt %. This is due to the agglomeration of $MoO_3$ NPs causing pore blockage.

TABLE 4

Swelling, porosity and mean pore radius of HF membranes.

| Membrane Code | Swelling (%) | Porosity (%) | Mean pore radius (nm) | Viscosity |
|---|---|---|---|---|
| M 0 | 40.4 | 39.5 | 6.1 | 1563 |
| M 1 | 52.9 | 46.2 | 9.8 | 2208 |
| M 2 | 66.9 | 55.5 | 12.1 | 2420 |
| M 3 | 65.3 | 53.5 | 11.0 | 2763 |

Permeation Study

The membrane permeability was estimated based on pure water flux (PWF) value of the membranes. The permeation study was performed with cross flow filtration set up. The HF membrane module was set up by assembling five HF membranes of 10 cm long into a holder and setting it with an adhesive. See A. J. Kajekar, B. Dodamani, A. M. Isloor, Z. A. Karim, N. B. Cheer, A. Ismail, S. J. Shilton, *Preparation and characterization of novel PSf/PVP/PANI-nanofiber nanocomposite hollow fiber ultrafiltration membranes and their possible applications for hazardous dye rejection,* Desalination, 365 (2015) 117-125; and A. Zulhairun, B. Ng, A. Ismail, R. S. Murali, M. Abdullah, *Production of mixed matrix hollow fiber membrane for CO 2/CH 4 separation,* Sep. Purif. Technol., 137 (2014) 1-12, each incorporated herein by reference in their entirety. Initially, HF membranes were subjected to compaction at 0.3 MPa Transmembrane pressure (TMP) pressure for 30 mins. Then, the pure water was taken in the feed tank and was allowed to pass through the HF membrane module at 0.2 MPa TMP. The PWF ($J_w$) was calculated by measuring the volume of permeate (Q) collected for a definite time interval (Δt) through the effective area of membrane (A) given in the equation below:

$$J_w = \frac{Q}{\Delta t \times A}.$$

Porosity and Mean pore radius ($r_m$). The porosity and pore size of the hollow fibers increased with the inclusion of $MoO_3$ NPs (Table 4, above). This increase is due to the hydrophilicity of $MoO_3$ containing HF membranes where the presence of higher $MoO_3$ would attract more water flow into the membrane, leading to higher porosity. Also, a portion of PEG-1000 was seeped out of the dope solution during the demixing and functioned as a pore-former daring phase inversion, hence causes the enhancement of overall porosity of HF membrane. See J. Abdoul Raguime, G. Arthanareeswaran, P. Thanikaivelan, D. Mohan, M. Raajenthiren, *Performance characterization of cellulose acetate and poly (vinylpyrrolidone) blend membranes,* J. Appl. Polym. Sci., 104 (2007) 3042-3049, incorporated herein by reference in its entirety. However, the addition of 3.0 wt. % of $MoO_3$ nanoparticles, decreased the porosity due to agglomeration of $MoO_3$ nanoparticles. This is because the viscosity of the polymer solutions increased with the addition of $MoO_3$, causing delayed demixing leading to decreased porosity. See R. Sengur, C.-F. de Lannoy, T. Turken, M. Wiesner, I. Koyuncu, *Fabrication and characterization of hydroxylated and carboxylated multiwalled carbon nanotube/polyethersulfone (PES) nanocomposite hollow fiber membranes,* Desalination, 359 (2015) 123-140, incorporated herein by reference in its entirety.

Figure 7:
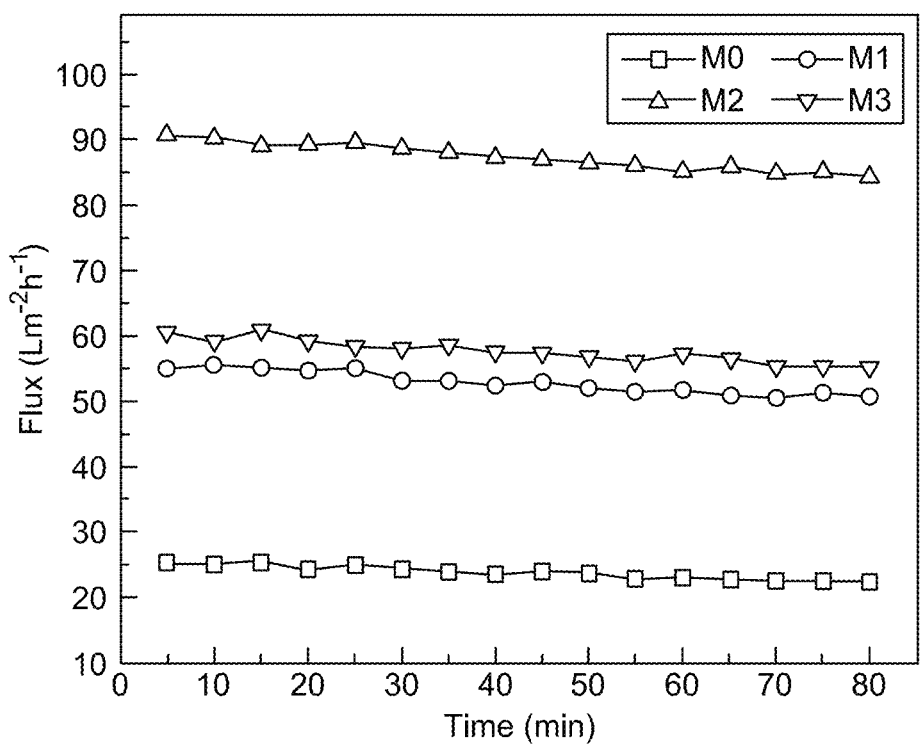
FIG. 7 shows pure water flux of the HF membranes; MO (pink, bottom trace), M1 (green, second to bottom trace), M2 (blue, top trace), M3 (red, second to top trace).

Water Flux Study. FIG. 7 displays the pure water flux (PWF) values of the HF membranes carried out at 0.2 MPa TMP. It can be observed that the PWF of M0 membranes increased from 23 $Lm^{-2} h^{-1}$ to 89 $Lm^{-2} h^{-1}$ on the addition of 2 wt % of $MoO_3$ nanoparticles to the polymer dope. The hike in PWF is the product of combined effect of larger pore size and surface hydrophilicity. The water flux declines as the membrane hydrophilicity and pore size decreased with further enhancing the concentration of $MoO_3$ NPs from 2 wt % to 3 wt % membrane. This is because of the high viscosity of dope solution which leads to the formation of spongy sublayer as a result of slow demixing. The pore clogging and the pore collapse in membrane cross-section due to agglomeration of NPs also contributed to the lower water flux.

Antifouling and Antibiofouling Study

The antifouling nature of the membrane was measured by flux decline ratio (FDR) and the flux recovery ratio (FRR). See S. Zha, J. Yu, G. Zhang, N. Liu, R. Lee, Polyethersulfone (PES)/cellulose acetate butyrate (CAB) composite hollow fiber membranes for BTEX separation from produced water, RSC Adv. 5 (2015) 105692-105698, incorporated herein by reference in its entirety. The BSA solution of 1000 ppm was taken in the feed tank and was pre-filtered. BSA solution was filtered at 0.2 MPa TMP for 80 minutes. The HF membranes were cleaned by water washing and clean water was passed through the HF membranes at 0.2 MPa TMP for 80 minutes. The FDR and FRR were calculated by the following formula:

$$FDR(\%) = \frac{(J_w - J_p)}{J_w} \times 100 \quad (5)$$

$$FRR(\%) = \frac{J_w'}{J_w} \times 100 \quad (6)$$

where '$J_p$' is the flux of BSA solution and '$J_w$' is the pure water flux of membranes after cleaning.

The antibiofouling ability of the prepared HF membranes was studied by microbial inhibition test. The bacterial culture of *Mycobacterium smegmatis* (MS), *Staphylococcus aureus* (SA) and *Escherichia coli* (EC) were utilized for the study. The HF membranes of 3 cm length were cut and immersed in the microbial cultures for 12 hours. Then the HF membranes were placed on the nutrient agar media and examined for the bacterial growth over the HF membrane samples. Sterilized Whatman filter paper strip was used as a control.

Heavy Metal Rejection

The removal of a toxic heavy metal ion from the feed solution was conducted by filtration experiment. The aqueous solution of lead nitrate and cadmium nitrate were prepared by dissolving 1 g of heavy metal salt in 1000 mL water to obtain a concentration of 1000 ppm. The heavy metal ion solution was taken in the feed tank were filtered individually through the membranes and the permeate was collected. The heavy metal ion rejected by the membrane was determined by measuring the metal ion concentration in the feed and permeate by using the AAS (Atomic Absorption Spectrometer) (GBC 932 Plus) and the percentage rejection was calculated using equation (6):

$$R = \left(1 - \frac{C_p}{C_f}\right) \times 100, \quad (7)$$

where, $C_f$ and $C_p$ are the concentration of feed and permeate solution (g/L), respectively.

Figure 10:
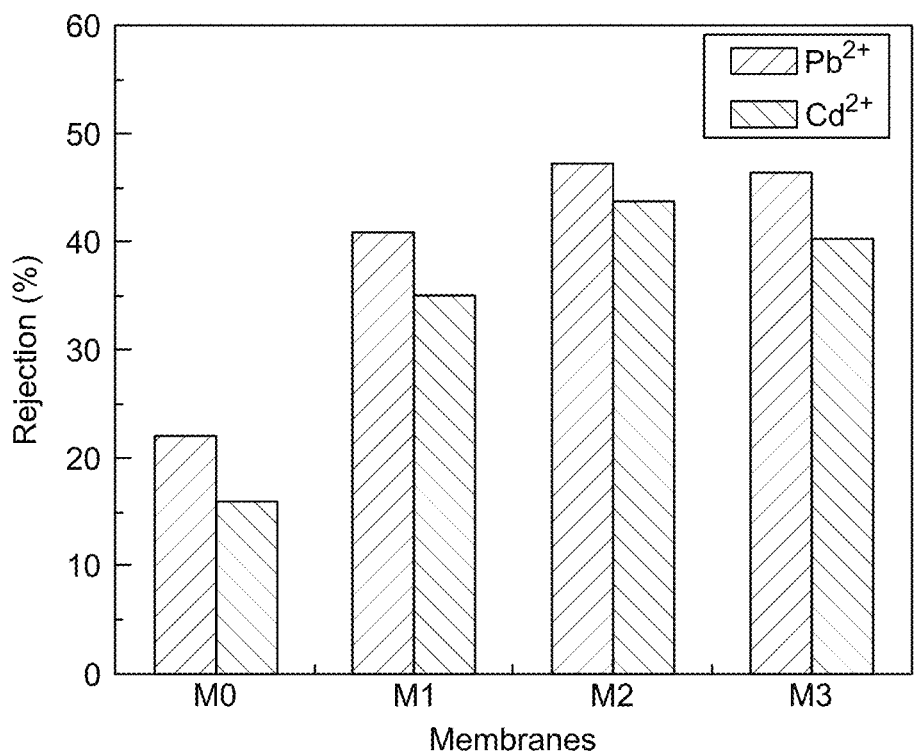
FIG. 10 depicts heavy metal ion rejection by HF membranes. The first (green) bar in each of the four samples describes Pb$^{2+}$ rejection in percent; the second (red) bar in each sample describes Cd$^{2+}$ rejection.

Heavy Metal Rejection Study. The rejection of the heavy metal ions such as $Pb^{2+}$ and $Cd^{2+}$ were shown in the FIG. 10. The rejection of metal ions was observed due to adsorption of positively charged heavy metal ions on negatively charged membranes. The negatively charged $MoO_3$ NPs imparted a negative charge onto the membranes surface, thereby contributing accessible active sites for the adsorption of $Pb^{2+}$ and $Cd^{2+}$ ions. The membranes with highest 3 wt % of $MoO_3$ showed lower rejection than the 2 wt % of $MoO_3$. This may be due to the aggregation of NPs at a higher concentration that causes lower surface area for adsorption. The higher removal capacity was exhibited for $Pb^{2+}$ could be due to the chemisorption $Pb^{2+}$ between oxygen deficient $MoO_3$ NPs and $Pb^{2+}$ ions. The larger size of $Pb^{2+}$ to that of $Cd^{2+}$ ions also caused the higher rejection of $Pb^{2+}$ ions.

Figure 8:
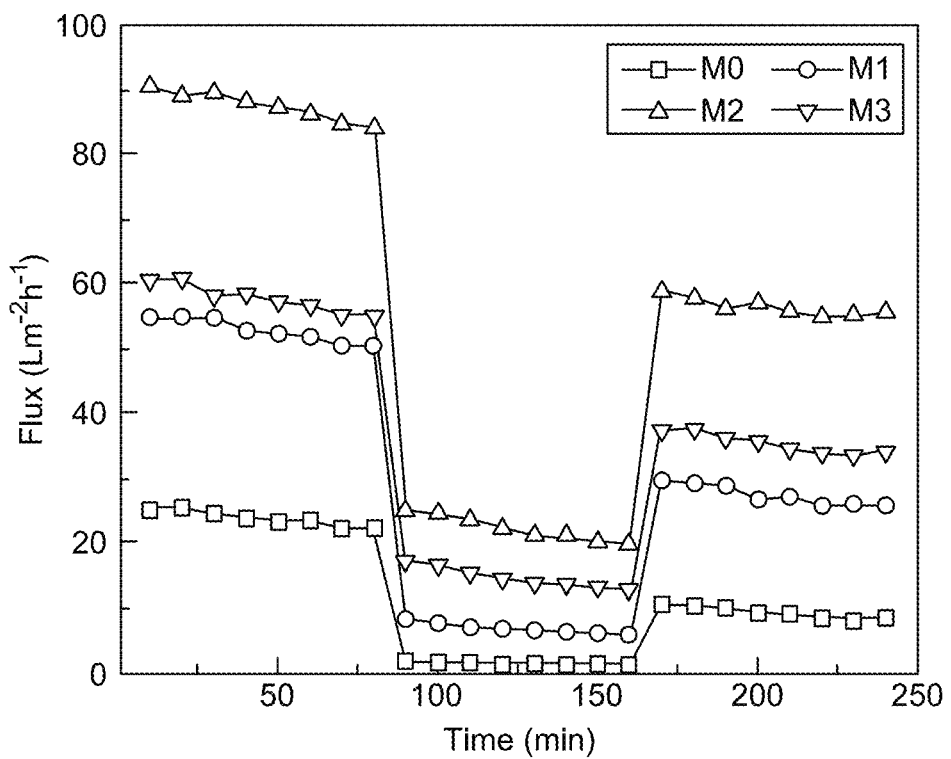
FIG. 8 depicts flux vs. time graph for membranes at 0.2 MPa during pure water flux for 80 min, 1.0 g/L BSA solution flux for 80 min, and pure water flux for 80 min after thorough hydraulic washing. M0 (black, bottom trace, squares), M1 (red, 2$^{nd}$ to bottom trace, circles), M2 (aquamarine, 2$^{nd}$ from top trace, downward pointing triangles), M3 (blue, top trace, upright triangles).

Antifouling and antibiofouling study. The antifouling study of membranes was conducted by filtration of BSA solution. The HF membrane was then back washed and pure water flux of backwashed membranes was studied. The flux of the HF membranes was recorded at 0.2 MPa TMP at 27° C. by passing BSA solution as feed alternately (FIG. 8). The pure water flux of the membranes declined during BSA ultrafiltration that may be attributed to the adsorption of BSA on the membrane surface and pores.

Figure 9:
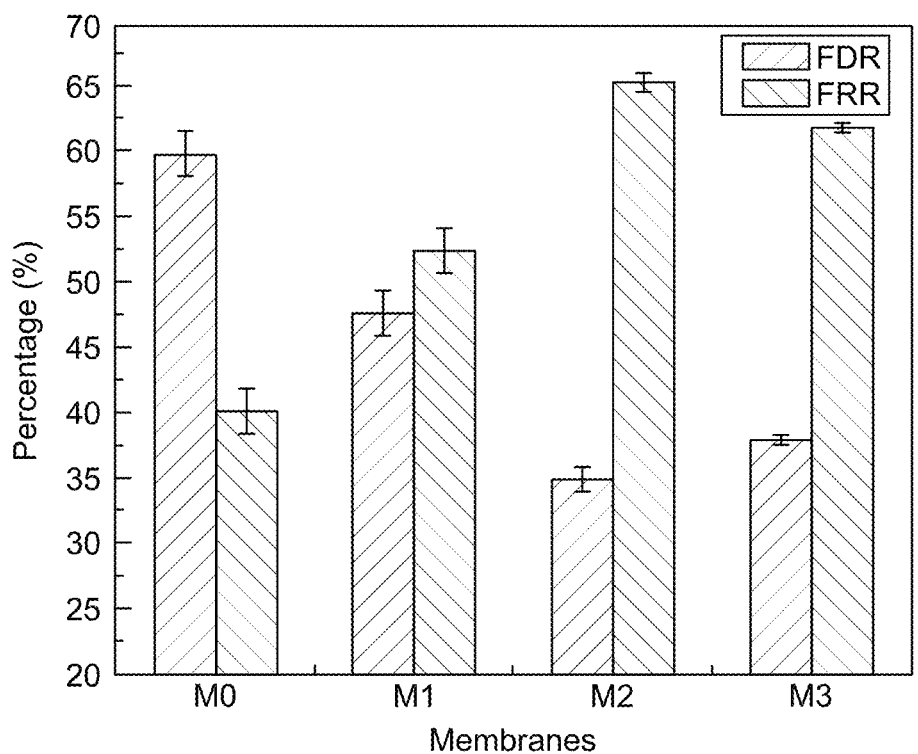
FIG. 9 FDR and FRR ratio of HF membranes

The antifouling ability and membrane reusability were evaluated by calculating the % FDR and % FRR value for the hollow fiber membranes (FIG. 9). The % FDR value of decreased with the addition of $MoO_3$ NPs with least FDR value of 34.91% by M2. The pristine membranes exhibited lowest % FRR values whereas the hollow fibers containing $MoO_3$ NPs showed better % FRR values. Membrane M 2 showed the highest flux recovery ratio of 65%. Higher % FRR indicates that, in the presence of $MoO_3$ nanoparticles, the BSA molecules did not remain adsorbed on the membrane surface after the BSA filtration. The negatively charged membrane surface developed by incorporation of negatively charged $MoO_3$ NPs inhibited the adhering of negatively charge BSA on its surface due to electrostatic repulsion. Moreover, simple hydraulic cleaning could do the removal of loosely adhered BSA molecules from the membrane surface. Thus, the high FRR and low FDR value indicate the improved antifouling behavior for nanocomposite HF membranes.

The antibiofouling study revealed that nanocomposite HF membranes exhibited resistance to microbial growth. FIG. 13 shows the images of the membranes placed on the agar plates after 24 h of incubation. The nanocomposite HF membrane M2 showed inhibition to the bacterial growth while the Whatmann filter paper showed microbial colony. The antibiofouling nature of these nanocomposite membranes was due to the antibacterial activity of the $MoO_3$ NPs. The bacterial cell fatality was due to the raised reactive oxygen levels when in contact with the NPs. See O. Akhavan, E. Ghaderi, *Toxicity of graphene and graphene oxide nanowalls against bacteria,* ACS Nano, 4 (2010) 5731-5736; and K. Krishnamoorthy, M. Veerapandian, L.-H. Zhang, K. Yun, S. J. Kim, *Antibacterial efficiency of graphene nanosheets against pathogenic bacteria via lipid peroxidation,* The Journal of Physical Chemistry C, 116 (2012) 17280-17287, each incorporated herein by reference in their entirety. The antibiofouling property also may result from an electrostatic repulsive force between negatively charged $MoO_3$ NPs encrusted HF membranes and the surface of a microorganism like a bacterium.

Dye Removal Study

The dye removal efficiency of HF membranes was evaluated using Methylene Blue (MB) dye. The HF membranes were cut into pieces and were put in aqueous dye solutions of 10 ppm concentration. The solutions were agitated constantly at 200 rpm in an orbital shaker (ORBITEK LT) for 12 h under UV (11 W Philips), and dark conditions. See A. Chithambararaj, N. S. Sanjini, S. Velmathi, A. C. Bose, Preparation of h-$MoO_3$ and α-$MoO_3$ nanocrystals: comparative study on photocatalytic degradation of methylene blue under visible light irradiation, PCCP, 15 (2013) 14761-14769, incorporated herein by reference in its entirety. The small portion of the solution was collected and the concentration of dye was detected by measuring the absorbance at 665 nm using UV/Vis spectrophotometer (SPECORD S 600). The degree of dye removal was calculated using the equation (7).

Figure 14:
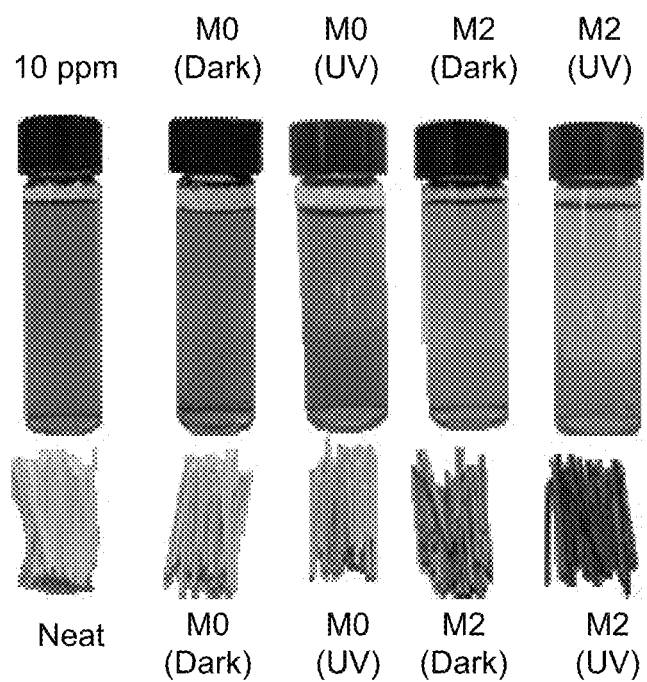
FIG. 14 is a S4 Digital image of MB solution and HF membranes after dye removal.

Dye removal study. The HF membrane M 0 and M 2, were placed in MB solution for dye removal of MB in dark condition and illuminated by UV light radiation. It was observed that M2 membranes could remove the MB dye from the solution as the color of membranes transformed from white to blue when dipped in MB solution (FIG. 14). M2 showed dye removal of 34.8% and 66.3% under dark and exposure to UV light radiation respectively. This was due to the adsorption of dye onto the negatively charged HF membranes. Since MB being a cationic dye, gets adsorbed onto the surface of HF membrane surface due to electrostatic interactions. See H. Li, Y. Lin, Y. Luo, P. Yu, L. Hou, Relating organic fouling of reverse osmosis membranes to adsorption during the reclamation of secondary effluents containing methylene blue and rhodamine B, J. Hazard. Mater., 192 (2011) 490-499, incorporated herein by reference in its entirety.

Figure 11A:
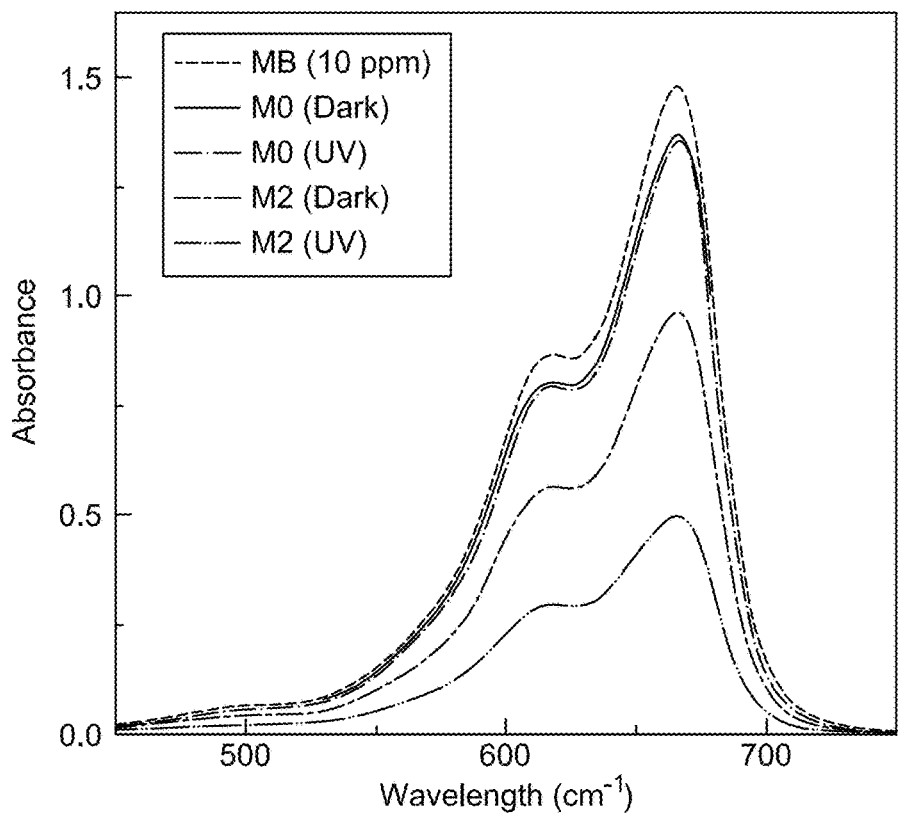
FIG. 11A describes the UV absorbance spectra of methylene blue solution.
Figure 11B:
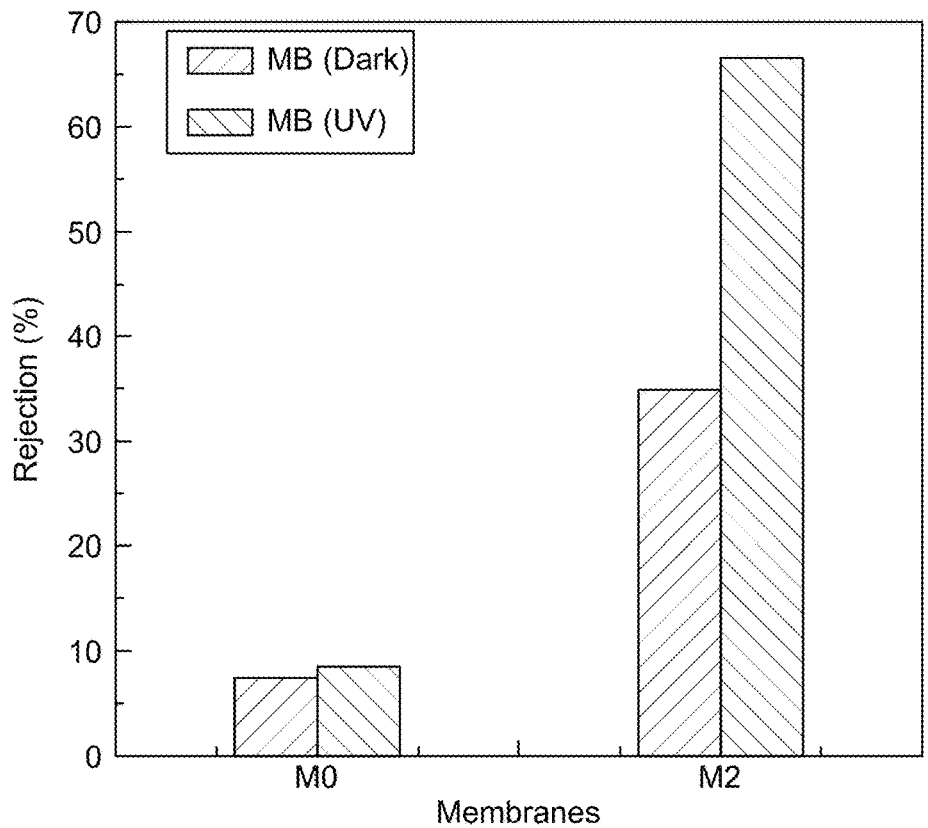
FIG. 11B methylene blue rejection by MO and M2.

The UV-visible spectrum of the MB dye solution revealed a strong absorption band at 665 nm for monomeric (0-0 band) and a small band at 605 nm for dimeric (0-1 band) forms of MB (FIG. 11A). The percentage of dye removal by M0 and M2 is shown in FIG. 11B. There is the difference in the amount of dye removed for M 2 membranes at UV light and dark condition. This is because of the photodegradation of MB dye by $MoO_3$ NPs in the UV light; see A. Chithambararaj, N. Sanjini, S. Velmathi, A. C. Bose, Preparation of h-$MoO_3$ and α-$MoO_3$ nanocrystals: comparative study on photocatalytic degradation of methylene blue under visible light irradiation, Phys Chem Phys, 15 (2013) 14761-14769, incorporated herein by reference in its entirety. That is, the electrons ($e^-$) from valence band gets excited to the conduction band by the incidence of the photon, thereby creating the holes ($h^+$) in the valence band. The water or hydroxide ions reacts with the holes created in the valence band to produce free radicals like hydroxyl radicals (.OH), and hydroperoxyl radicals (.$O_2H$). The hydroxyl radicals (.OH), can, in turn, causes degradation of MB; see Q. Zhuo, H. Ma, B. Wang, F. Fan, Degradation of methylene blue: Optimization of operating condition through a statistical technique and environmental estimate of the treated wastewater, J. Hazard. Mater., 153 (2008) 44-51, incorporated herein by reference in its entirety. This is because of the photodegradation of MB dye by $MoO_3$ NPs in the UV light.

As described herein, the inventors disclose and exemplify an innovative series of nanocomposite hollow fiber membranes with various contents of $MoO_3$ nanoparticles that were fabricated by dry-wet spinning. These results show that the nanocomposite membranes of the invention display enhanced hydrophilicity and permeability. For example, the permeation data show that PWF of the HF membrane with $MoO_3$ NPs was better than pristine membranes with the highest flux of 89 $Lm^{-2} h^{-1}$. Further, the nanocomposite membrane demonstrated the capacity to adsorb toxic heavy metal cations by showing rejection towards the $Pb^{2+}$ and $Cd^{2+}$ ions.

Moreover the nanocomposite hollow fiber membranes exhibited improved antifouling property with FRR and FDR of 65.5% and 34.9% respectively for 2 wt % of the $MoO_3$ nanoparticle. The antibiofouling data show that the resistance of nanocomposite membranes to bacterial strains including *Mycobacterium smegmatis* (MS), *Staphylococcus aureus* (SA) and *Escherichia coli* (EC).

Terminology. Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by insertion of a space or underlined space before "www" and may be reactivated by removal of the space.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), 15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc. ) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it is also envisioned that Parameter X may have other ranges of values including 1-9, 2-9, 3-8, 1-8, 1-3, 1-2, 2-10, 2.5-7.8, 2-8, 2-3, 3-10, and 3-9, as mere examples.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology. As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A composite hollow-fiber ("HF") membrane, comprising:
   a polymer and nanoparticles of molybdenum trioxide ("$MoO_3$"), wherein the nanoparticles range in average particle size from about 75 nm to about 500 nm.

2. The composite hollow-fiber membrane of claim 1, wherein the nanoparticles are about 266 ±87 nm in average particle size.

3. The composite hollow fiber membrane of claim 1, wherein porosity ranges from 35 to 60%.

4. The composite hollow fiber membrane of claim 1, wherein mean pore size ranges from 5 to 15 nm.

5. The composite hollow-fiber membrane of claim 1 that comprises about 0.1 to 5 wt % of the nanoparticles based on total weight of the membrane and nanoparticles.

6. The composite hollow-fiber membrane of claim 1 that comprises about 1.5 to 2.5 wt % of the nanoparticles based on total weight of the membrane and nanoparticles.

7. The composite hollow fiber membrane of claim 1 that has an average surface roughness ranging from 10 to 30 $R_a$ (nm).

8. The composite hollow fiber membrane of claim 1 wherein the hollow fiber membrane comprises longer elongated finger-like projections than those in an otherwise identical hollow fiber membrane produced without $MoO_3$ nanoparticles.

9. The composite hollow fiber membrane of claim 1, wherein the nanoparticles are embedded in or incorporated into a porous membrane.

10. The composite hollow fiber membrane of claim 1, wherein the nanoparticles are exposed on a surface of a porous membrane.

11. The composite hollow fiber membrane of claim 1, wherein the polymer comprises polyphenylsulfone (PPSU).

12. The composite hollow fiber membrane of claim 1 that is made by dry-wet spinning.

13. The composite hollow fiber membrane of claim 12 that has a higher hydrophilicity than an otherwise identical composite hollow fiber membrane not made with dry-wet spinning.

14. The composite hollow fiber membrane of claim 12 that has a higher permeability than an otherwise identical composite hollow fiber membrane not made with dry-wet spinning.

15. A method for removing lead, cadmium or another heavy metal from an aqueous solution comprising filtering the aqueous solution through the membrane according to claim 1.

16. The method of claim 15, wherein the composite hollow fiber membrane is a water-treatment membrane and the aqueous solution is wastewater.

17. A method for removing or photodegrading a dye in an aqueous solution comprising exposing the solution to visible light or UV irradiation while filtering the solution through the composite hollow fiber membrane according to claim 1.

18. The method of claim 17, wherein the composite hollow fiber membrane is a water-treatment membrane and the aqueous solution is wastewater.

19. A method for reducing membrane fouling during treatment of wastewater containing microorganisms comprising filtering the wastewater through the composite hollow fiber membrane according to claim 1.

20. A membrane bioreactor comprising the composite hollow fiber membrane of claim 1.

* * * * *